Dec. 6, 1966   R. L. OHMAN   3,289,888
CONTROL MECHANISM FOR VOLUMETRIC MEASURING
OF AGGREGATE MATERIALS
Filed Jan. 28, 1965   7 Sheets-Sheet 1

INVENTOR
RALPH L. OHMAN
BY
Hill, Sherman, Meroni, Gross & Simpson
ATTORNEYS

Dec. 6, 1966  R. L. OHMAN  3,289,888
CONTROL MECHANISM FOR VOLUMETRIC MEASURING
OF AGGREGATE MATERIALS
Filed Jan. 28, 1965  7 Sheets-Sheet 2

INVENTOR
RALPH L. OHMAN

BY
ATTORNEYS

Dec. 6, 1966 R. L. OHMAN 3,289,888
CONTROL MECHANISM FOR VOLUMETRIC MEASURING
OF AGGREGATE MATERIALS
Filed Jan. 28, 1965 7 Sheets-Sheet 5

INVENTOR
RALPH L. OHMAN

BY
Hill, Sherman, Meroni, Gross + Simpson
ATTORNEYS

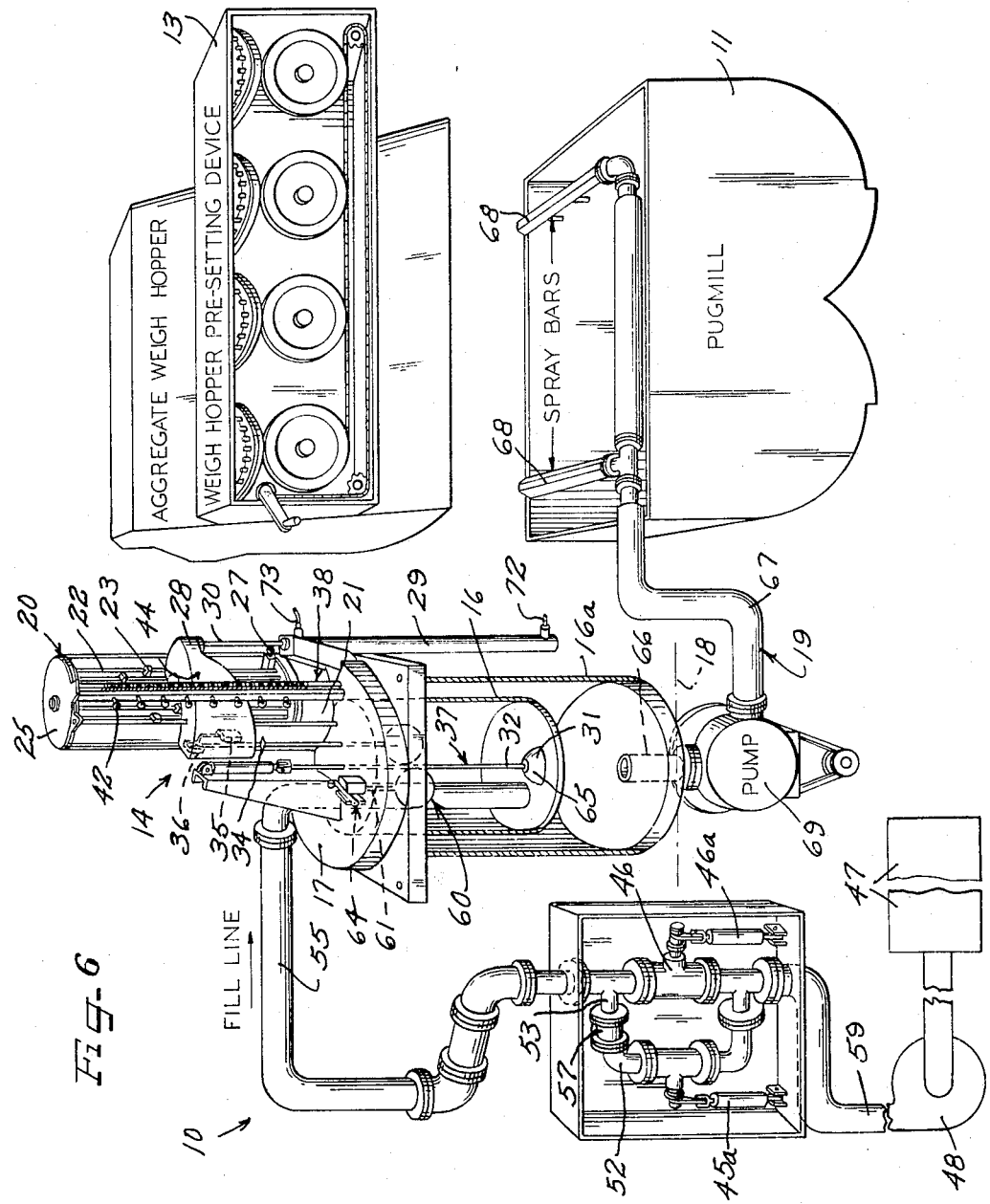

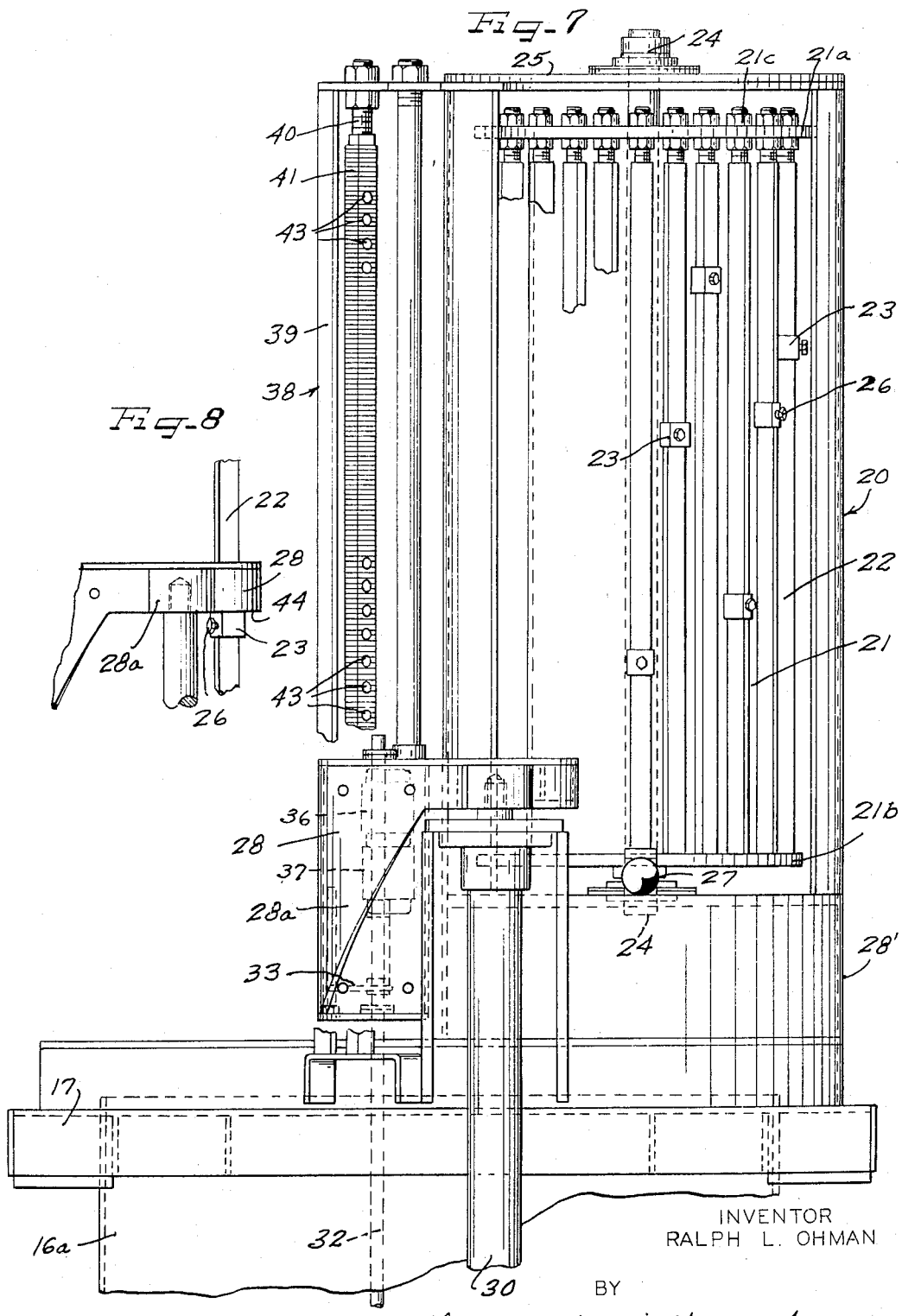

United States Patent Office 3,289,888
Patented Dec. 6, 1966

3,289,888
CONTROL MECHANISM FOR VOLUMETRIC MEASURING OF AGGREGATE MATERIALS
Ralph L. Ohman, North Aurora, Ill., assignor to Barber-Greene Company, Aurora, Ill., a corporation of Illinois
Filed Jan. 28, 1965, Ser. No. 428,764
13 Claims. (Cl. 222—43)

This invention relates to a batch asphalt plant and more particularly to an improved control mechanism for the volumetric measuring of aggregate and bitumen material. It will be appreciated that the subject of my control mechanism for the volumetric measuring of bitumen materials is more fully disclosed in my companion U.S. application entitled "Control Mechanism for Volumetric Measuring of Bitumen," filed January 28, 1965, Serial No. 428,727.

The basic difference between a "weigh" batch type asphalt plant and a "volumetric" type batch plant is described in U.S. Patent 2,893,602. Comparable size machines of the two types indicated have an equivalent tonnage output. Weigh batch type plants were first introduced to the asphalt contractor's market because measuring by weight was the accepted means of mix control and readily lends itself to changing the weight of ingredients required. The volumetric type plant on the other hand lends itself to producing a prescribed asphalt mix automatically after once set up by the operator. By nature of its design a series of weight calibrations are normally required to change mix proportions. The calibrations are time consuming and do not lend themselves to quick changeovers of types or percentages of aggregate materials as used with asphalt mixes.

Conventional hopper (single compartment) weigh systems use electronic scale controls to proportion correct amounts of materials for automatic plant operation. That is, electrical signals are picked up by movement of a weigh scale pointer and these signals are in turn amplified and passed on to some form of electrical balancing or memory circuitry. Changes made to obtain variable mix proportions are relatively easy to accomplish by movement of digital or dial controls which give a signal to the electronic control system indicating the weight desired. The electronic systems are relatively expensive however and current designs further have the basic disadvantage of being adapted to weigh in sequence. In order to improve existing batch plants the devices disclosed herein were developed to provide a mechanical system or device which would facilitate the setting up and quick changeover of variable aggregate proportions.

The subject control mechanism for a volumetric batch hopper provides a quick method of obtaining variable adjustable wall positions by a mechanical means for the basic purpose of changing the volumetric size of the weighing hopper compartment to conform to prescribed weight requirements. In this application a compartmented weigh hopper, is used to control the measurement of varying sizes of aggregate materials. Correct proportioning of aggregate materials provides balanced aggregate mixes which after having bitumen introduced to same will result in an asphalt composition which is suitable for asphalt pavement.

The prime purpose for making use of a volumetric means of measuring rather than controlling by the conventional weight method is to save time in a batch type plant operating cycle. This results in an increased production for a given machine.

Time is saved, for the devices herein disclosed enable several materials to be discharged simultaneously into a volumetric weigh hopper. In the more conventional weigh measurement hoppers previously used each material had to be weighed individually, in sequence.

The presetting and precalibrated means in this invention enables the operator to simultaneously change the volume of all compartments to a predetermined weight distribution and maintain the changed proportions until such time as a different weight distribution is desired.

An important object of this invention is to provide a new and improved apparatus for controlling aggregate flow through a weigh hopper of variable selectable volumes.

Still another object of this invention is to provide a weigh hopper presetting device and an asphalt weigh tank presetting device of a type whereby an operator can conveniently coordinate the devices in the production of properly proportioned mixes or batches of asphalt and aggregate.

A further object of this invention is to provide a weigh hopper presetting device which can be quickly changed over to enable different volumes to be supplied to a pug mill within a minimum period of time and with a minimum amount of effort on the part of the operator.

Still another object of this invention is to provide a weigh hopper presetting device which can be used with a series of hoppers disposed in side-by-side relation which hoppers are to contain different types of aggregate whereby the device can be conveniently calibrated to deliver different volumes of different types of aggregate to the side-by-side weigh hoppers to enable a correctly proportioned aggregate mix to be produced.

Still another object of this invention is to provide a weigh hopper presetting device which after being preset and precalibrated can be operated by an operator to simultaneoeusly change the volume of all compartments to a predetermined weight distribution and maintain the changed proportions until such time as a different weight distribution is desired.

Yet another object of this invention is to provide a mechanical device which facilitates the setting up and quick changeover of variable aggregate proportions.

Other objects and features of this invention will more fully become apparent in view of the following detailed description taken in conjunction with the accompanying drawings illustrating a single embodiment and in which:

FIGURE 6 is an enlarged schematic view of certain components of a batch plant illustrating the coordination of the aggregate and bitumen presetting devices;

FIGURE 7 is an enlarged fragmentary side view of an asphalt weigh tank presetting device; and FIGURE 8 is an enlarged fragmentary detailed view showing the manner of coaction of the carriage with a stop block.

As shown on the drawings:

Figure 1:
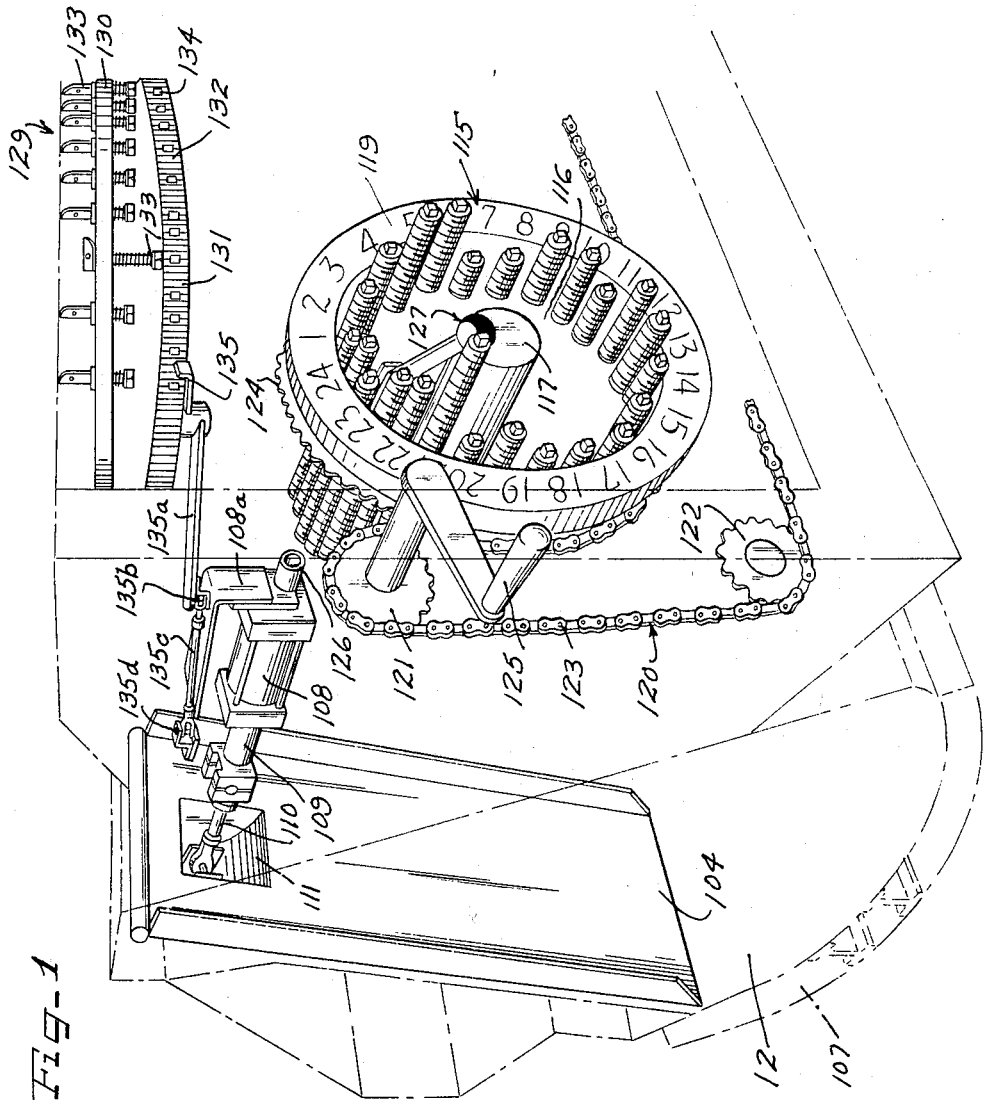
FIGURE 1 is an enlarged fragmentary schematic view of an aggregate weigh hopper having a weigh hopper presetting device embodying important features of this invention.

The reference numeral 10 indicates generally certain components of a batch type asphalt plant which includes a pug mill 11 (FIGURE 6). An aggregate weigh hopper 12 is disposed in overlying relation to the pug mill. This hopper 12 has a weigh hopper presetting device 13 and the operation of this device embodies important features of this invention.

According to important combination features of this invention, a bitumen or fluid supplying apparatus 14 is provided for coaction with other more conventional components of a batch asphalt plant. This apparatus includes a bitumen or asphalt supply system 15 for supplying bitumen or asphalt or fluid to a tank assembly including a weigh tank 16 and a surge tank 16a. A tank cover 17 is provided at the open end of the weigh tank 16. The weigh tank is mounted on a scale which may be of any suitable type such as a dial scale, the scale being indicated at 18 in the drawing. Cooperable with the weigh tank is a spray distribution system 19 for supplying controlled predetermined volumes of asphalt or fluid with controlled predetermined volumes of aggregate to the pug mill for mixing.

According to other important combination features of this invention, an asphalt weigh tank presetting device 20 is mounted at the side of the weigh tank 16 on the surge tank 16a or on the tank assembly. This device 20 includes a drum 21 or means for supporting upright bars or members 22. A series of twenty-four of the stop mounting bars 22 is secured in fixed relation at opposite ends with the drum in any suitable manner. To this end, the drum is provided with a pair of circular drum flanges 21a and 21b and an upper end of each bar is secured by fasteners 21c to the associated drum flange while the opposite end of each bar may be welded or otherwise secured to the other associated drum flange 21b.

Each stop mounting bar 22 has a stop block 23 which can be positioned and securely fixed at any desired location along the vertical axis of the stop mounting bar 22. The entire drum 21 including the bars 22 and the stops 23 is supported by bearings 24 which provide for free rotation of the drum 21 within a housing 25. Rotation of the drum 21 is required to index a given stop or stop block 23 to an operating position.

It is significant to note that the drum 21 has been provided with twenty-four (24) of the stop mounting bars 22 and the reason is to match the twenty-four (24) preset positions attainable with the aggregate weigh hopper presetting device that is to be hereafter described.

Each stop block has means in the form of a retaining bolt 26 for securing the block in a variable selectable position on the bar 22. The drum 21 is also provided with means comprising a spring-loaded locking device 27 to maintain the rotating drum 21 in a given position once it has been properly aligned with respect to a carriage 28. It will be noted that the housing 25 has a base 28' and that the spring-loaded locking device 27 coacts with the base in holding the drum 21 in a fixed position.

A single-ended hydraulic cylinder 29 is mounted in a fixed position on the cover 17 alongside the tank 16 and which cylinder has a ram 30 joined with the carriage 28 for moving the carriage up and down in various selected positions.

*Float assembly*

The float assembly includes a float 31 having a float rod 32 and a float rod guide pin 33 (FIGURE 7) is carried on the float rod 32. The float rod guide pin 33 coacts with a side wall 28a of the carriage for maintaining the float rod 32 in a vertical position. Also carried on the float rod 32 is a vane switch actuator 34 which coacts with magnetic Reed switches 35 and 36 carried on the carriage 28 to control the supply of bitumen or fluid being transmitted to the tank 16.

The float assembly 37 is positioned at a predetermined location along the vertical axis of the complete preset control mechanism. This assembly including the float 31, the float rod 32, and the vane switch actuator 34 when properly positioned serves as the liquid level monitoring unit.

*Calibration device*

The reference numeral 38 indicates a calibration device similar to the one covered by U.S. Patent No. 3,128,014. This device employs a first element 39 which is mounted in fixed relation on the housing 25 at one end and supported on the weigh tank cover 17 at an opposite end. Mounted in vertical position alongside of the first element is an upright square bar or rod 40 and a stretchable element of measurement 41 is mounted thereon. The stretchable element of measurement has convolutions and convolution securing elements 42 are provided alongside of the upright bar and supported on the first element 39 to maintain the convolutions of the spring coil in proper position due to the natural tendency of the coil to sag. By providing the square bar or rod 40 with square coils, the indicator spring 41 is prevented from spiraling. Also mounted on the stretchable element or spring 41 are a series of graduated identifying indicia 43.

By virtue of the fact that the carriage 28 is provided with a carriage reference point 44 (FIGURE 8) the operator can move the carriage 28 to any predetermined position with respect to the graduated identifying indicia 43 and maintain the carriage in such position while the weigh tank 16 is being filled so that when the float rod 32 is elevated, the vane switch actuator 34 can operate the switches 35 and 36 for controlling the further flow of fluid to the tank 16.

The calibration device 38 can be calibrated in the manner described in the U.S. Patent 3,128,014.

*Fluid control*

As previously mentioned, two magnetic Reed vane type limit switches 35 and 36 are provided on the carriage 28. These switches are positioned to maintain a three-inch differential for actuation. The reason for having two vane switches is to provide control of two asphalt fill valves including a low rate filling valve 46. The three-inch switch differential eliminates turbulent liquid flow and ensures accurate measuring at the final cutoff point as will be further described hereafter.

The magnetic Reed switches 35 and 36 are used in lieu of rocker arm type limit switches to keep the actuation force required at a minimum. Reed switches are actuated by shunting out of a magnetic field and no physical contact or friction is required to accomplish this purpose.

*Operation of the system*

As in the case of my companion disclosure, the principle of this system is to preset or position the physical stop 26 and allow the hydraulic cylinder 29 to cause the carriage 28 to come into physical contact with the stop. In this case, the held position represents a vertical distance.

The purpose of the float assembly 37 used in conjunction with the cutoff switches 35 and 36 as described, is to determine by volume, the amount of liquid asphalt to be placed in the weigh tank 16. The source of asphalt supply is located on the ground and in this instance is identified as a fluid reservoir 47. A motor operated pump 48 is provided adjacent to the reservoir 47 and is joined thereto by a fluid line 49. A series of fluid lines are provided for operating the fluid system as more fully described in my companion disclosure. The aforesaid valves 45 and 46 are located in the fill lines.

The valves 45 and 46 in the filling lines are controlled by the switches 35 and 36 which determine whether or not the weigh tank 16 is to be filled or asphalt is to be allowed to circulate through the pumping system and bypass the weigh tank 16. Also provided in pressure or fill lines 52 and 53 is flow regulator 57 which provides a variable orifice for regulating flow to the tank 16.

Should the fluid level in the tank 16 become excessive, means are provided as indicated at 60 for shutting down the motor operated pump 48. This means includes a float 61, a float rod 62, a switch actuator (not shown), which float is allowed to move up and down in accordance with the level of the liquid in the tank 16. Mounted in adjacency to the float rod 62 is an overflow safety cut-off switch 64 which is actuatable by the float actuator in the manner previously described.

Mounted internally of the tank 16 is an asphalt tank dump valve 65, which may be held in a closed position while the tank 16 is filled with a desired volume of fluid or asphalt and which can be lowered to allow the contents of the tank to be dispensed through tank unloading fluid lines 66 and 67 and through a pair of spray bars 68 into the pug mill 11. A pump 69 is provided for pumping out the weigh tank 16 and to cause the asphalt to be dispensed through the spray bars at a desired pressure.

*Pre-setting procedure*

Indicated below is an example of the procedure to be followed in establishing preset positions of liquid level cutoff points.

*Step I.*—With the asphalt tank dump valve 65 closed and filling valves 45 and 46 in their normal circulating position, the asphalt transfer pump 48 and the asphalt spray pump 69 are allowed to run.

*Step II.*—The preset drum 21 and the stop bar 22 are rotated manually to position No. 1. Also, the hydraulic ram 30 operating the vane control means comprising the vane switches carried on the carriage 28 are lowered to the minimum operating position as the ram is retracted into the cylinder. Control of this mechanism is accomplished by the use of a solenoid, operated control valve (not here shown). The speed of the hydraulic ram is controlled by a hydraulic flow control valve (not here shown). These valves are joined to opposite sides or ends of the cylinder by means of fluid lines 72 and 73. The valves are connected at an opposite end to a hydraulic fluid source. After the drum has been properly indexed, the spring-loaded locking device 24 holds the drum in a fixed position.

*Step III.*—The filling valves 45 and 46 are actuated to their fill tank positions and asphalt is allowed to flow into the weigh tank 16. As asphalt liquid comes into contact with the float assembly 37, the float 31 is caused to rise. The vane switch actuator 34 rises with the float 31 and it passes through a rectangular slot in the lower vane switch 35 causing the switch to be actuated and thereby allowing fill valve 45 to close. As this occurs, asphalt liquid (bitumen) is allowed to flow at a reduced rate through the fill valve 45 while at the same time the remainder of the asphalt is caused to bypass the valve 45 and to flow to the reservoir 47. Liquid flow or filling of the weigh tank 16 continues until the float assembly 37 rises to a position where the switch actuator 34 passes through the second vane switch 36 which causes the fill valve 46 to close. Filling of the weigh tank for this minimum volume position is now complete and bitumen is completely bypassing the weigh tank through the closed fluid lines.

In the preceding description it will be appreciated that the valves 45 and 46 are actuated by hydraulic cylinders 45a and 46a. These cylinders are controlled through conventional solenoid operated valves (not shown) which valves 45 and 46 are in turn operatively connected with the switches 36 and 35, respectively.

*Step IV.*—The asphalt liquid weight for this minimum volume position is now indicated on the weigh tank scale 18. The stretchable element of measure 41 having the numbered coils 43 that represent liquid weights is positioned so that the weight as shown on the dial scale is also at the readout point 44 on the switch carriage 28. The minimum volume or weight has now been properly calibrated on the calibration device 38.

*Step V.*—The hydraulic ram 30 is allowed to extend thereby raising the limit switch carriage 28 several inches. Steps III–IV are repeated and the second liquid weight will be then calibrated in the same manner. This procedure is followed in increments of several inches until the hydraulic ram 30 has been extended through its full stroke. When this procedure has been completed, the asphalt weigh tank 16 and the spring indicator 41 will then be calibrated for the liquid being used.

*Step VI.*—Once this system is calibrated, pre-set stop positions are readily accomplished. As an example, if it is desired to transmit 100 pounds liquid weight of asphalt into the tank 16, the hydraulic ram 30 is allowed to move the carriage 28 until the reading point 44 is aligned with the coil indicating 100 pounds on the spring indicator or stretchable element 41. The stop block 23 on the associated mounting bar 22 is moved to an underside of a carriage finger 28a which is part of the carriage assembly 28. The stop block 23 is then locked in position by operation of the retaining bolt or fastener 26 and any time the hydraulic ram moves the carriage into contact with this stop block, the 100 pound weight will be measured or weighed into the weigh tank 16.

In order to establish other preset weights, a simple procedure is followed. Th hydraulic ram 30 is allowed to extend to its maximum extended position. The spring-loaded locking device 27 is released and the drum 21 is allowed to rotate to any desired numbered position. After the spring-loaded locking device 27 is engaged, the hydraulic ram 30 is allowed to lower until the required weight is read out at the spring indicator or stretchable element 41. Again the stop block 23 corresponding to the particular drum position is located under the finger 28a of the carriage 28. When the stop block 23 is locked in position with its retaining bolt 26, a new preset position has been established.

*Control mechanism for use with volumetric measuring of aggregate materials*

Figure 2:
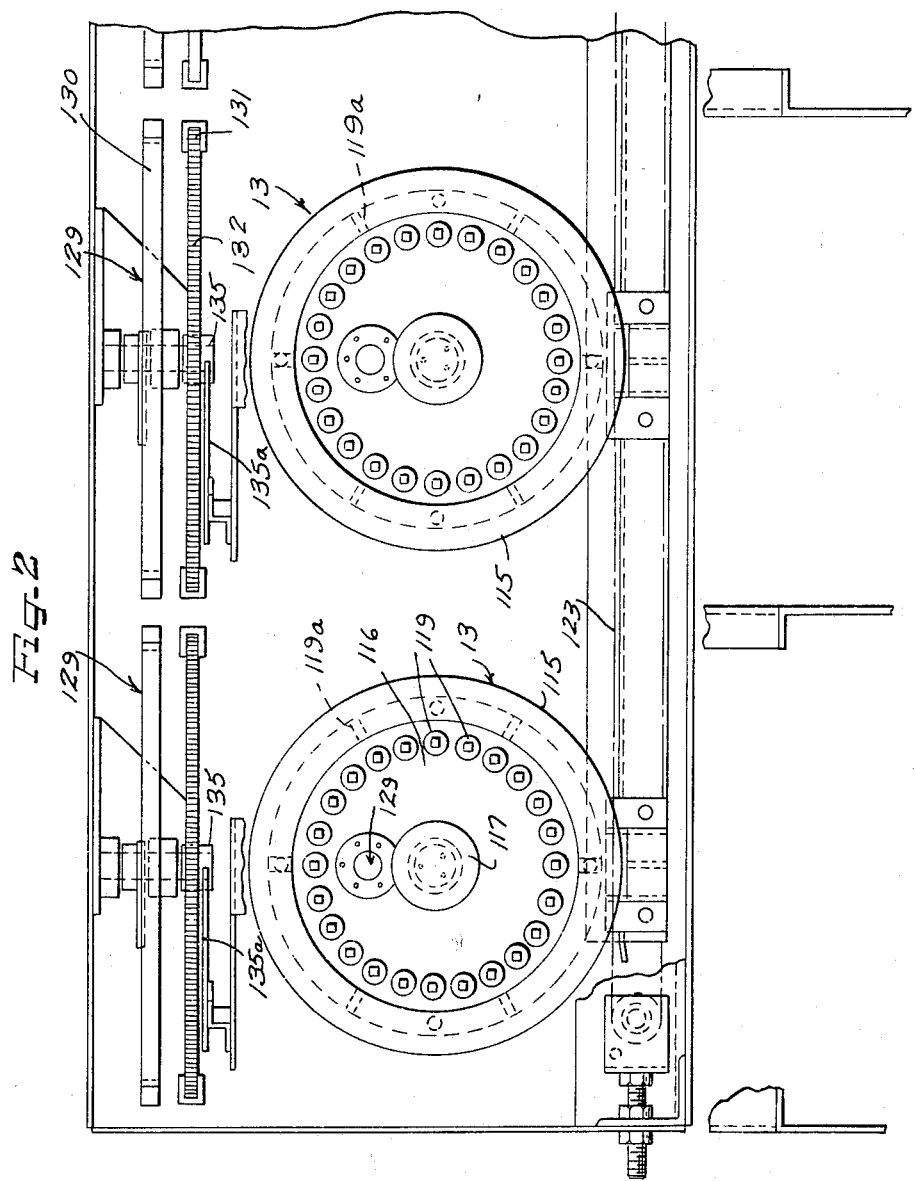
FIGURE 2 is an enlarged fragmentary front view of a weigh hopper presetting device.
Figure 3:
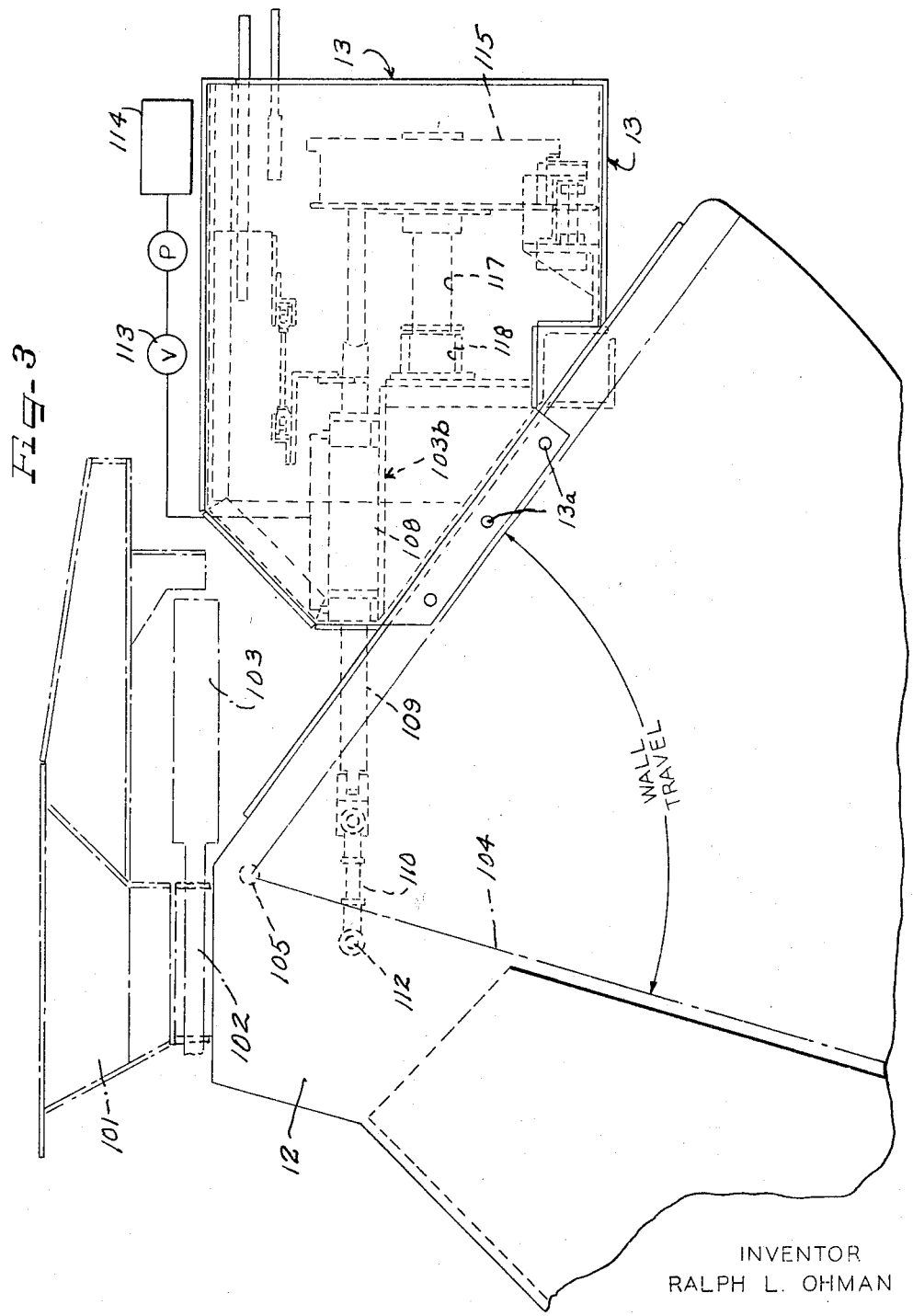
FIGURE 3 is an enlarged fragmentary schematic view illustrating in full and dotted lines the manner by which the divider wall and the weigh hopper can be calibrated and operated.

As is illustrated in FIGURE 3, a storage bin 101 is mounted over the aggregate weigh hopper 12. It will be appreciated that a series of aggregate weigh hoppers 12 are disposed in side-by-side relation (FIGURE 2) as are the weigh hopper presetting devices 13, since these components are essentially identical, a description of one component will suffice for the others.

As is conventional, the storage bin 101 is provided with a supply bin gate 102 and a gate actuating cylinder 103 is mounted at one side for permitting aggregate material to be loaded in the aggregate weigh hopper 12 as shown in FIGURE 3. The weigh hopper presetting device 13 is mounted on the aggregate weigh hopper 12 as indicated at 13a in FIGURE 3.

The weigh hopper 12 further includes an adjustable wall 104 which is pivotally mounted at its upper end with the walls of the hopper as indicated at 105. The adjustable wall 104 is mounted in adjacency to a fixed wall 106 as is shown in FIGURE 3. Clam operable discharge gates 107, 107 underlie the adjustable wall 104 (FIGURE 1).

In order to control the adjustable or divider wall 104, a double ended hydraulic cylinder 108 is mounted on the frame of the weigh hopper presetting device as indicated generally at 103b. The cylinder 108 has a ram which extends into the interior of the aggregate weigh hopper 12 and which is joined at one end of a connecting rod 110. The adjustable wall 104 has a recess 111 and an opposite end of the connecting rod 110 is pivotally connected at 112 with the adjustable wall 104 in the recess 111. The hydraulic cylinder 108 is operated by means of a hydraulic directional control valve 113 which is provided in a conventional type of hydraulic system that also includes a fluid reservoir 114.

The weigh hopper presetting device 13 has a housing 13c and a series of stop discs 115 are mounted within the housing. Each of the stop discs includes as a component part, an interior plate 116. To this plate 116 is mounted a supporting shaft 117 and the supporting shaft 117 is carried on bearings 118 (FIGURE 3).

The stop disc 115 has a series of circularly arranged stop screws 119 which are mounted on a circle concentric with the disc. These stops or stops screws 119 provide multiple adjustments for each individual adjustable wall 104, thereby enabling the side-by-side weigh hoppers 12 to be loaded with varied proportions of aggregate, as may be required for different types of batch mixes.

As was previously described, the discs 115 are mounted on the bearings 118 and means 120 is provided for rotating the discs in unison with one another. This means includes a series of sprockets such as are indicated at 121 and 122 with the sprockets being carried on the frame 13b of the weigh hopper presetting device. An endless chain 123 is entrained over the sprockets and engaged with disc teeth provided at the periphery of the discs 115. A crank handle 125 is secured to the sprocket 121 for rotating the sprockets and for aligning a stop screw on each disc 115 with a screw receiving socket 126 disposed at an opposite end of the hydraulic cylinder 108.

Figure 4:
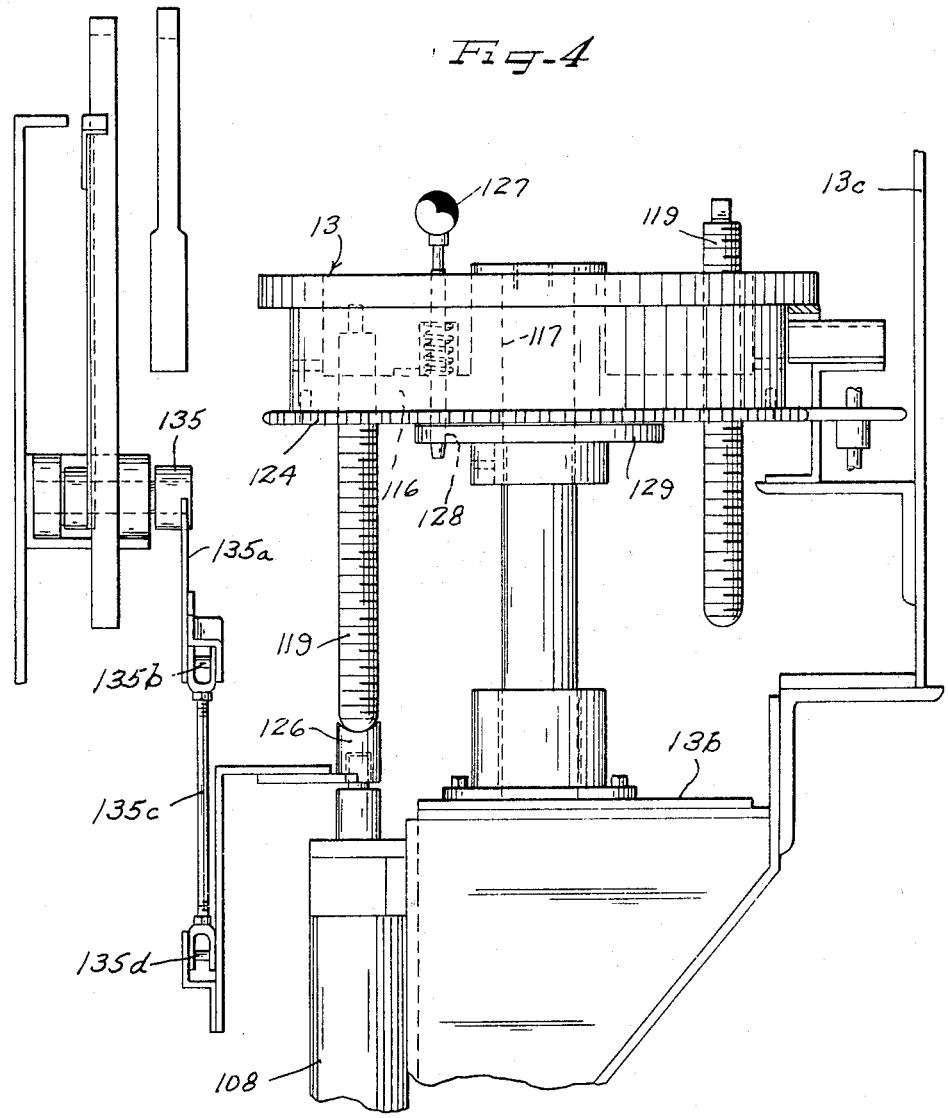
FIGURE 4 is an enlarged fragmentary plan view of the weigh hopper presetting device.
Figure 5:
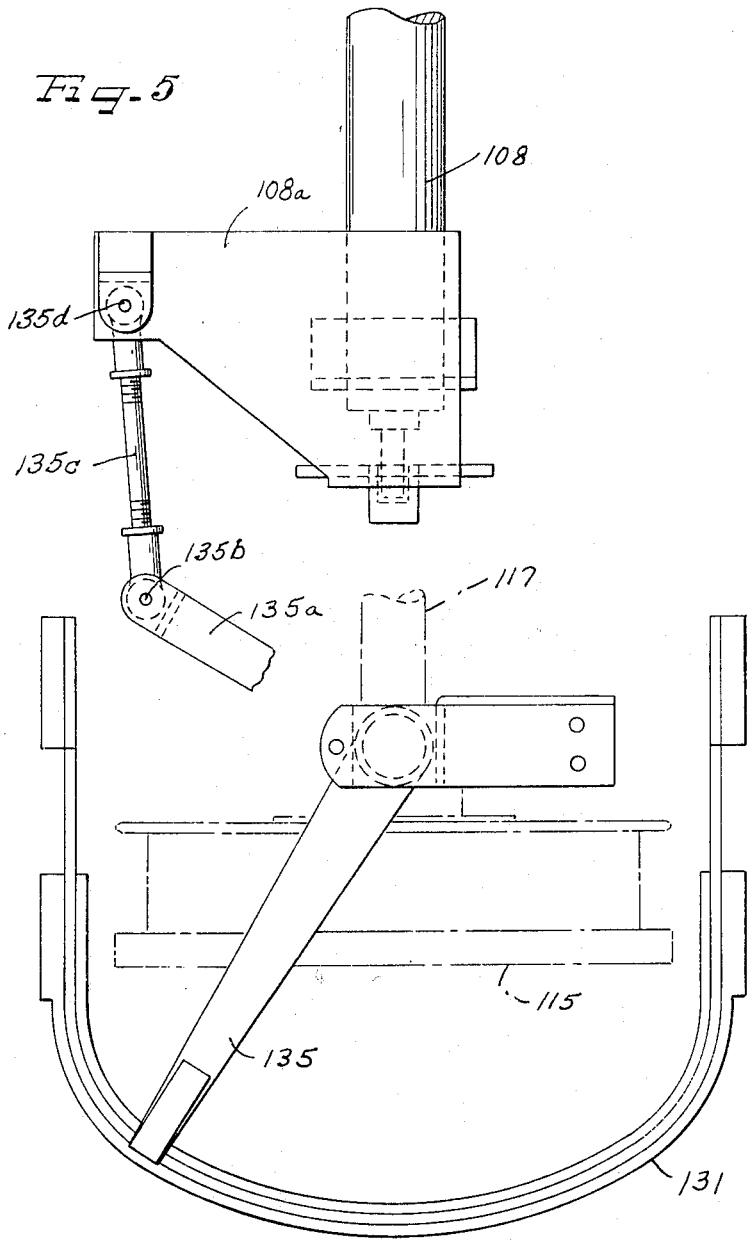
FIGURE 5 is an enlarged fragmentary view illustrating the manner of operation of the spring indicator.

After the selected stop screw 119 has been aligned with the associated screw receiving socket 126, a spring loaded stop mechanism 127 is extended through the interior disc plate 116 and engaged in a socket 128 on a frame supported plate 129 that is concentric with the shaft 117 (FIGURE 4). It will be appreciated that the stop mechanism 127 carried by the stop disc 115 is locked with the frame, further movement or rotation of the stop discs is prohibited. When the stop mechanism is disengaged, the sprockets are positioned and timed so that upon rotation equal angular movement will occur as each stop disc passes through a full 360 degrees of travel.

*Aggregate calibration device*

An aggregate calibration device 129 is mounted in overlying relation with respect to each stop disc 115. Each device 129 includes a first element 130 and a curved bar or member is positioned in underlying relation with respect to the first element 130. A stretchable element of measurement or spring 132 is mounted on the bar 131. A series of convolution securing elements 134 are carried on the first element 130 and are extendible between the convolutions of the spring against the curved bar 131 for holding the convolutions in adjusted position as is generally described in U.S. Patent 3,128,014. Indicia 134 are provided on the spring 132 to enable the operator to more readily calibrate this device 129. The indicia or numbers 134 provided on the coils signify weight of aggregate.

The curved bar or member 131 is so constructed as to be shaped to simulate the same arc of travel that the adjustable wall 104 passes as it is pivoted at 105. Mounted over the curved bar 131 is an indicator or indicator arm 135 that is driven by the actuation of the hydraulic ram and the indicator 135 indicates the wall position at the stopped wall position, as will be further described hereafter.

(A) *Operation of the System.*—Mounted on the volumetric weigh hopper 12 in a fixed horizontal positional position are the double ended hydraulic cylinders 108, (one for each wall). One end of the cylinder rod is fastened to the movable, adjustable wall by means of the close tolerance, free moving connecting rod 110. The other end of the hydraulic cylinder is connected to a spring indicator drive mechanism that is mounted on the cylinder by means of cylinder bracket 108a. The mechanism includes the indicator 135, a first lever arm 135a, and second lever arm 135c that is connected at 135b to the first lever arm 135a and that is pivotally connected at 135d to the cylinder bracket 108a, which also uses a free moving connecting rod. Also, the special socket adapter 126 is fastened to the same free end of the ram. The stop discs 115 having threaded screw stops 119 and mounted on a very accurately controlled bolt circle are positioned in a fixed distance away from the free end of the hydraulic cylinder 108.

Rotation of the stop discs 115 is controlled by the manually operated endless chain drive which is used to index the stop disc to its desired predetermined position.

The principle of the system design is to preset or position a physical stop at a fixed location and to allow a hydraulic cylinder to extend itself until it comes into physical contact with that stop. Hydraulic pressure is maintained against the extended end of the cylinder to hold positive position. Hydraulic oil leaks will not affect the system's accuracy.

(B) *Presetting Procedure.*—Indicated below is an example of the procedure involved in presetting one wall position—assuming 1000 pounds of weight is desired (1) The weigh hopper adjustable wall 104 is driven to its minimum volume position by operating the hydraulic directional control valve which controls the movement of the hydraulic cylinder 108.

(2) One of adjustable screw stops 119 is turned to come into contact with the free end of the hydraulic cylinder 108. At this time, the spring indicator 135 is also driven to its minimum pointer position (reading of the extension spring scale 132 means nothing at this point of operation).

(3) The gate 102 which discharges material to the weight hopper is opened and material is allowed to flow, thus filling the adjustable wall compartment to the minimum volume and weight obtainable. With a reversal of the hydraulic control directional valve, the adjustable pivoting wall 104 now wants to extend or open. However, it is restricted by the minimum position of the screw stop 119. At this time the screw stop 119 is turned out until the desired weight is obtained on a weight scale upon which the weigh hopper is hung. When this weight is shown on the scale dial, the charging gate 102 is closed.

It should be indicated for clarity purposes that when the charging gate is opened and material has filled the compartment in the weigh hopper, a solid column of material will exist from the bottom gate of the weigh hopper and up through the charging area above the charging gate. This insures a full compartment. Therefore, when the charging gate 102 is closed, the solid column is relieved and the weight shown on the hopper scale will read X pounds lighter than previously noted. This is due to the loss of material head. This differential weight will have to be noted and the charging gate would again be reopened and the stop screw 119 would be backed off with the ram wall connection following until a new position is reached indicating the make up or original light weight differential. Upon closing the charging gate a second time, the correct weight, in this case 1000 pounds, will be noted.

(4) The correct wall position has now been established. Provision has been made by use of a set screw 119a to lock the screw stop 119 in its present position and no further changes will be required to obtain the weight of 1000 pounds in this compartment unless a change is desirable.

(5) At this point the spring indicator pointer 135 will have been driven to a corresponding fixed point. The extension spring 132 will have an established individual coil rate of 10 pounds per coil and, therefore, 100 coils are to be slid on a guide bar F under the indicator pointer. This spring and indicator will now match the weigh hopper dial scale reading.

(6) The same procedure as items B1 thru B5 above are to be followed for obtaining additional wall settings above 1000 pounds with other stop screws. However, if quantities less than 1000 pounds are needed, they may be obtained when working through the steps to obtain the first so-called 1000 pounds.

Steps B1 thru B6 are to be followed for each of the individual walls.

(7) All preset positions of the stop discs 115 are matched, numbered and all discs will be held in the same relative position to one another by means of the timed chain drive mechanism 120. Once the preset positions are established, indexing from one set of wall positions to another is done simply by retracting the adjustable walls 104 by use of the hydraulic cylinders 108 and rotating the master stop 115 to the desired preset position. Once the position has been selected and indexed, hydraulic pressure on the cylinder 108 is reversed and the walls 104 will follow the ram 109 until the stops 119 are positively engaged.

Although minor modifications might be suggested by those versed in the art, it should be understood that I wish to embody within the scope of the patent warranted hereon, all such modifications as reasonably and properly come within the scope of my contribution to the art.

I claim:

1. In a batch type asphalt plant including an aggregate weigh hopper having aggregate compartments therein and a weigh tank for common distribution of aggregate and bitumen to a pug mill, the improvement combination comprising a weigh hopper presetting device operatively associated with each compartment of the weigh hopper for enabling variable selectable volumes of aggregate to be loaded in the aggregate weigh hopper, and an asphalt weigh tank presetting device associated with the weigh hopper for enabling variable selectable volumes of asphalt to be loaded in the aggregate weigh hopper, each of said devices having correspondingly numbered aggregate and bitumen stop blocks enabling variable selectable volumes of aggregates and bitumen to be properly proportioned by correlating appropriately numbered aggregate stop blocks with the appropriately numbered bitumen stop block after the devices have been once calibrated.

2. In a volumetric type batch plant including an aggregate weigh hopper, and a weigh tank for common distribution of aggregate and bitumen to a pug mill, the improvement combination comprising a weigh hopper presetting device operatively associated with the weigh hopper for enabling variable selectable volumes of aggregate to be loaded in the aggregate weigh hopper, an asphalt weight tank presetting device associated with the weigh hopper for enabling variable selectable volumes of asphalt to be loaded in the aggregate weigh hopper, and means on each of said devices for cooperating together enabling variable selectable volumes of aggregate and bitumen to be properly coordinated to produce a multitude of different types of mixes.

3. An apparatus for volumetric measuring of aggregate comprising a weigh hopper, an adjustable wall mounted for pivotal movement at one end, a weigh hopper presetting device including a stop disc, circumferentially spaced stop screws mounted on said disc, a freely moving connecting rod secured at one end with said adjustable wall in an arc, a hydraulic cylinder having a ram operatively connected with said adjustable wall, means for rotating said stop disc for aligning any one of said stop screws with said cylinder, said stop screws being longitudinally adjustable generally in a direction towards and away from said cylinder, a calibration device including a first element, a curved bar positioned in adjacency to said first element, a stretchable element of measurement having convolutions mounted freely on said curved bar, a series of convolution securing elements secured along the length of said first element and being extendable into contact with said convolutions and said curved bar for maintaining the stretchable element of measurement in adjustable positions, an indicator arm pivotally mounted at one end and with the arm being positioned as a radius of said curved bar, the curved bar being shaped so as to simulate the same arc of travel through which the adjustable wall passes, and, means connecting said indicator arm with said hydraulic cylinder for pivoting the indicator arm as the adjustable wall is swung through its arc.

4. In combination, a weigh hopper having a divider wall and a hydraulic cylinder for moving the wall through an arc therein, and a calibration device including a first element, a curved bar positioned in adjacency to said first element, a stretchable element of measurement having convolutions mounted freely on said curved bar, a series of convolution securing elements secured along the length of said first element and being extendable into contact with said convolutions and said curved bar for maintaining the stretchable element of measurement in adjustable positions, an indicator arm pivotally mounted at one end and with the arm being positioned as a radius of said curved bar, the curved bar being shaped so as to simulate the same arc of travel through which the adjustable wall passes, and means connecting said indicator arm with said hydraulic cylinder for pivoting the indicator arm as the adjustable wall is swung through its arc.

5. An apparatus for volumetric measuring of aggregate comprising, a scale, a weigh hopper operatively associated with said scale having compartments therein, an adjustable wall mounted for pivotal movement at one end in each compartment, a weigh hopper presetting device including a stop disc for each compartment, circumferentially spaced stop screws mounted on each disc and extending coaxially of the axis of the disc, each divider wall having a hydraulic cylinder having a ram operatively connected with said divider wall, and with said cylinder having an opposite end for engagement with the stop screw on an associated one of said discs, said stop screws being longitudinally adjustable generally in a direction towards and away from said cylinder, and means for rotating said stop disc for aligning any one of said stop screws with the associated cylinder.

6. An apparatus for volumetric measuring of aggregate comprising, a scale, a weigh hopper operatively associated with said scale having compartments therein, an adjustable wall mounted for pivotal movement at one end in each compartment, a weigh hopper presetting device including a stop disc for each compartment, circumferentially spaced stop screws mounted on each disc, each divider wall having a hydraulic cylinder having a ram operatively connected with said divider wall, and with said cylinder having an opposite end for engagement with the stop screw on an associated one of said discs, said stop screws being longitudinally adjustable generally in a direction towards and away from said cylinder, means for rotating said stop disc for aligning any one of said stop screws with the associated cylinder, said means for rotating said discs comprising sprockets, said discs having disc teeth, an endless chain entrained over said sprockets and said disc teeth, and means for rotating said sprockets for aligning any one of said stop screws for operative engagement with said hydraulic cylinder.

7. An apparatus for volumetric measuring of aggregate comprising a weigh hopper having gates, an adjustable wall mounted for pivotal movement from an upper end and overlying said gates, a weigh hopper presetting device including a stop disc, circumferentially spaced stop screws mounted on said disc, bearings supporting said disc, a hydraulic cylinder joined with said adjustable wall and having an opposite end for operative engagement with any one of said stop screws, means for rotating said stop disc for aligning any one of said stop screws with said screw receiving socket on said cylinder, a calibration device including a spring element of measurement and an indicator for signifying the position of said adjustable wall and the volume of aggregate in said weigh hopper, and means connecting said cylinder with said indicator for moving the indicator as the adjustable wall is adjusted to enable the volume of the weigh hopper to be designated by the indicator on the element of measurement.

8. An apparatus for volumetric measuring of aggregate comprising, a weigh hopper, an adjustable wall mounted in said hopper, a weigh hopper presetting device including a stop disc, circumferentially spaced stop screws mounted on each disc and extending coaxially of the axis of the disc, each divider wall having a hydraulic cylinder having a ram operatively connected with said divider wall, and with said cylinder having an opposite end for engagement with the stop screw on said disc, said stop screws being longitudinally adjustable generally in a direction towards and away from said cylinder, means for locking each stop screw in a fixed position against longitudinal movement, means for locking said disc against rotation, and means for rotating said stop disc for aligning any one of said stop screws with the associated cylinder.

9. An apparatus for volumetric measuring of aggregate comprising a scale, a weigh hopper operatively associated with said scale and having gates, an adjustable wall mounted for pivotal movement from an upper end and overlying said gates, a weigh hopper presetting device including a stop disc, circumferentially spaced stop screws mounted on said disc, bearings supporting said disc, a freely moving connecting rod secured at one end with said adjustable wall, a hydraulic cylinder having a ram connected with said freely moving connecting rod at one end and having a screw receiving socket at an opposite end for engagement with any one of said stop screws, means for rotating said stop disc for aligning any one of said stop screws with said screw receiving socket on said cylinder, said stop screws being longitudinally adjustable on said disc generally in a direction towards and away from said adjustable wall, and means for causing the hydraulic cylinder and adjustable wall to move in a direction toward the stop screw for positioning the socket and stop screw in operative engagement.

10. In a batch type asphalt plant including an aggregate weigh hopper and a weigh tank for distribution of aggregate and bitumen to a pug mill, the improvement combination comprising a weigh hopper presetting device operatively associated with the weigh hopper for enabling variable selectable volumes of aggregate to be loaded in the aggregate weigh hopper, and an asphalt weigh tank presetting device associated with the weigh hopper for enabling variable selectable volumes of asphalt to be loaded in the weigh tank.

11. In a volumetric batch plant having a supply hopper, a measuring hopper operatively associated with said supply hopper, an adjustable divider wall mounted in said measuring hopper, the improvement comprising a measuring hopper presetting device connected with said adjustable divider wall and with said device having a series of preset positions any one of which when associated with said adjustable divider wall are capable of enabling a selected volume of aggregate to be delivered into said measuring hopper, and a hydraulic cylinder connected at one end with said divider wall and at an opposite end with any one of said preset positions permitting the position of the divider wall to be thereby controlled by the operation of the hydraulic cylinder whereby a selected volume of material can be loaded into the supply hopper depending on the position of the adjusted divider wall.

12. In a volumetric batch plant having a supply hopper, a measuring hopper operatively associated with said supply hopper, an adjustable divider wall mounted in said measuring hopper, the improvement comprising a measuring hopper presetting device connected with said adjustable divider wall and with said device having a series of preset positions any one of which when associated with said adjustable divider wall are capable of enabling a selected volume of aggregate to be delivered into said measuring hopper, a hydraulic cylinder connected at one end to said adjustable wall and at an opposite end to any selected one of said presets, and a calibration device mounted in adjacency to said device and having an indicator connected with said cylinder which indicator is responsive to the movement of said adjustable wall for giving a reading on said calibration device.

13. In a volumetric batch plant having a supply hopper, a measuring hopper operatively associated with said supply hopper, an adjustable divider wall mounted in said measuring hopper, the new combination comprising a measuring hopper presetting device connected with said adjustable divider wall and with said device having a series of preset elements any one of which when associated with said adjustable divider wall are capable of enabling a selected volume of aggregate to be delivered into said measuring hopper, a hydraulic cylinder connected at one end to said adjustable wall and at an opposite end to any selected one of said elements, and a calibration device mounted in adjacency to said device and having an indicator connected with said cylinder which indicator is responsive to the movement of said adjustable wall for giving a reading on said calibration device, said elements being in planes parallel to the cylinder.

(References on following page)

References Cited by the Examiner

UNITED STATES PATENTS

| | | | |
|---|---|---|---|
| 1,697,675 | 1/1929 | Baker | 222—43 |
| 1,715,257 | 5/1929 | Thurston | 222—43 |
| 2,769,573 | 11/1956 | Miller | 222—309 X |
| 2,893,602 | 7/1959 | Barber et al. | 222—438 X |
| 3,081,913 | 3/1963 | Rotter | 222—250 |

FOREIGN PATENTS 246,379   1/1926   Great Britain.

M. HENSON WOOD, JR., *Primary Examiner.*

HADD S. LANE, LOUIS J. DEMBO, *Examiners.*